May 18, 1937.  E. L. CARILLON  2,080,559
CHECKING DEVICE
Filed March 9, 1936
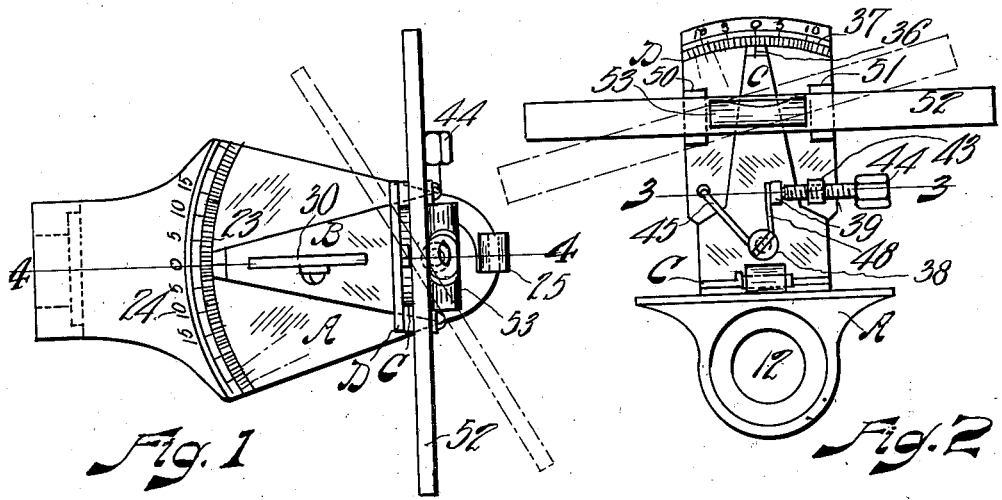
Fig. 1  Fig. 2
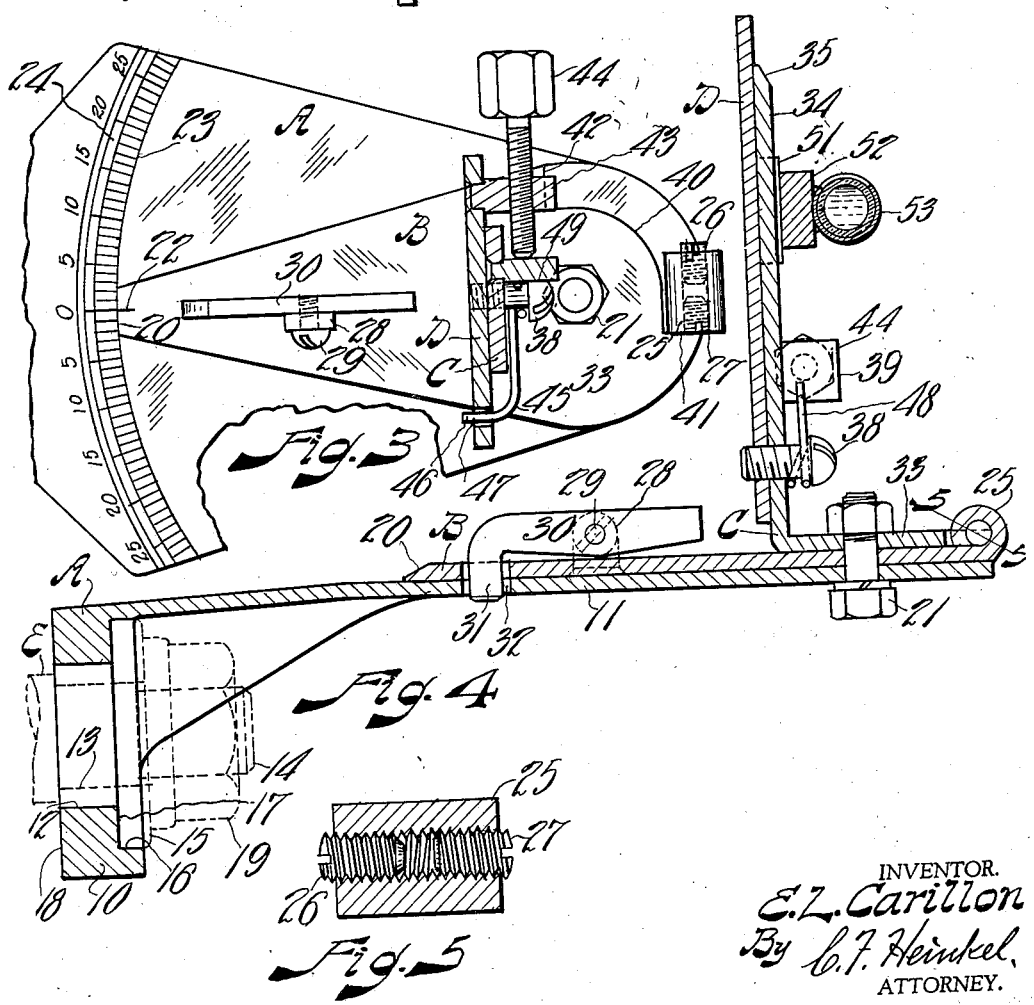
Fig. 3
Fig. 4
Fig. 5
INVENTOR.
E. L. Carillon
By C. F. Heinkel
ATTORNEY.

Patented May 18, 1937

2,080,559

UNITED STATES PATENT OFFICE 2,080,559

CHECKING DEVICE

Eugene L. Carillon, Bedford, Ohio

Application March 9, 1936, Serial No. 67,784

14 Claims. (Cl. 33—203)

The present invention relates to checking of angularly related objects such as wheels of an auto or the axles thereof.

In prior art devices it is necessary that some stand or the like is provided for supporting the devices; in some it is necessary that the floor be level or means be provided to level at least a part of it. Prior devices have pointers which move over a row of graduation marks but such devices are easily damaged in the rough uses to which the same are subjected in the usual garages.

The present invention aims to provide a device which is not easily damaged by use and which eliminates most of the disadvantages found in the prior art and which does not get out of order easily.

Objects of the present invention are: To provide a simple, easily operable, easily applied, and easily removed checking device having a wide range of application and usefulness to be easily applied to a mechanism to be checked. To provide such a device with means whereby the easy applying also applies the device in correct concentricity and alinement with the axis of the mechanism to be tested. To provide such a device with a straight edge which can swivel in a certain plane and move transversely of that plane. To provide such a device with a scale means directly formed on and of parts of the device. To provide such a device with parts which are pivotable relative to other parts and some of the parts to swivel on an axis in one plane and others on an axis in another plane. To provide such a device with a spirit level for setting the straight edge horizontally.

Other objects will be pointed out in this specification during the description of the device shown in the accompanying drawing, or will become obvious and apparent and become suggestive upon an inspection thereof.

The present invention is illustrated in the one embodiment thereof shown in the accompanying drawing although applicant is aware that the present invention can be embodied in other structures within the scope and spirit of the present invention and the appended claims.

In the accompanying drawing, forming part of this specification:

Fig. 1 is a plan view of a certain checking device embodying the present invention.

Fig. 2 is an end view of the device shown in Fig. 1.

Fig. 3 is a horizontal section, on a larger scale, taken on the line 3—3 of Fig. 2 to show more clearly the mechanism whereby pivoting of the members is attained.

Fig. 4 is a vertical section, on a larger scale, taken on the line 4—4 of Fig. 1 to show the relation of the elements more clearly.

Fig. 5 is a section, on a larger scale, taken on the line 5—5 of Fig. 4.

Similar reference characters refer to similar parts throughout the views.

Description of the device shown in the accompanying drawing now follows:

The base member A has the ear 10 on one end thereof, extending downwardly from the flat part 11, and having the bore 12 therethrough to receive the adapter mechanism, shown in dotted lines therein, comprising the adapter 13 fitting to and exchangeable for different kinds of ends 14 of shafts, the washer 15 entering and loosely fitting diametrically the counterbore 16 in the ear 10 and being squarely abuttable on the bottom 17 of the counterbore which is square with the axis of the bore 12; the face 18 being parallel with the bottom 17 and also square with the axis of the bore 12. This structure enables the checking device to be attached and held to the end of the shaft by means of the nut 19 and to centralize the device on the end of the shaft and to hold the same square thereto.

The plate B is pivoted on the pivot pin 21, here shown as an ordinary bolt with an ordinary nutlock and ordinary nut thereon, and extending through the forward end of the plate B for swivelling or pivoting the plate B relative to the flat part 11 and the base A as a whole.

The rearward end 20 of the plate B is beveled, forming a part of a scale means, has the mark 22 to indicate angularity and terminates at the inner edge 23 of the circular row of graduations 24 one of which is marked "0" representing zero. The outer end of the plate B has the boss 25 formed thereon by bending some of the material of the plate B into a circle extending upwardly from the plate B. The interior of this formed boss is threaded to receive the adjustable screws 26 and 27 in the respective ends thereof.

The lug 28 is shown as being secured to the plate B, the pivot screw 29 extends through the lug 28 and is journaled therein and has the dog 30 secured to the end thereof. The toe 31 is bent down from the body part of the dog 30 and enters the aperture 32 extending through the plate B and the flat part 11 and fits closely therein sidewise although there may be some clearance for the toe 31 endwise as shown. The apertures in the plate B and in the part 11 are in alinement when the mark 22 registers with the mark 0 on the scale.

The bracket C, also formed of flat material similar to the plate B, has the foot part 33 bent at right angles to the upright part 34, is also pivoted on the pivot pin 21 to pivot about the axis thereof and has the upper end 35 of the upright part beveled and has the mark 36 on this beveled face to indicate angularity and terminates at the inner edge of the circular row of graduation marks 37 one of which is marked "0" representing zero. The pivot pin 38, a commercial screw, is shown as being threaded into the upright part 34. The lug 39 is shown as being secured to the plate C and extends outwardly or forwardly of the same. The foot part 33 is recessed at 40 to form the shoulder 41 for abutting the screw 27 when the toe 31 and the aperture 32 in the plate B register with the aperture in the part 11 of the base and the mark 22 registers with the zero mark. This recessing also forms the shoulder 42 to abut the screw 26 when the bracket B is pivoted to a right angle relation to that shown in the drawing.

The plate D, also of stock similar to the plate B and the bracket C is pivoted onto the pivot pin 38 to swivel or pivot thereon and has the circular row of graduation marks 37 on the upper end thereof. The lug 43 is shown as secured to the plate D and is threaded internally to receive the adjusting screw 44 which abuts the lug 39 endwise for adjusting or moving the plate D, relative to the bracket C. The spring 45 is supported on the pivot pin 38 and has the free end 46 thereof extending through the aperture 47 in the plate D and the other free end 48 thereof abutting the face 49 of the lug 39.

The spacing blocks 50 and 51, of commercial stock, are secured to the plate D at the respective sides thereof and the straight edge 52 is secured to both of the blocks in such a manner that the edges thereof are at right angles with the pivot of the pivot pin 21 and at right angles with the pivot pin 38.

The spirit level 53, shown as a commercial level, is secured to the straight edge 52 for determining horizontality of the straight edge.

The checking device is shown as attached to the steering axle E by removing therefrom the nut 19 but leaving the usual steering wheel thereon. The adapter 13 is made to fit the now exposed part of the axle, the ear 10 is then telescoped over the adapter and the washer 15 and the nut 19 are then applied and tightened up and thereby attach the device to the axle exactly concentric with and in correct alinement with the axis of the axle. The spirit level is then used to set the straight edge level which may be done either by pivoting the plate D or by pivotally moving the entire device on the axle; the latter being preferable in that the setting of the parts of the device will remain normal. That is, the marks on the plate B and on the bracket C will correspond with the respective zero marks on the base and on the plate D; this facilitates subsequent determining of angularity in that the angles can be read directly without adding or subtracting differences which may have been made in the leveling of the straight edge by means of relatively pivoting parts of the device. When the straight edge is horizontal and extends across the device as is shown in full lines in the drawing, a straight edge may be placed against the side of a wheel on the axle, or against a part of another part on an axle or of a shaft, sighting from the straight edge on the device to the additional straight edge applied, will show that the wheel is at right angles to the axle when both straight edges are parallel and that the wheel is not at right angles to the axle when the straight edges are not parallel and will also show how much the two straight edges deviate from being parallel and in which direction the wheel is out of being at right angles to the axle.

In order to check the wheel for its angular relation with the axis of the axle after the device is attached to the axle, the dog 30 is first released, the mechanism on the top of the part 11 is then pivoted to bring the mark 22 opposite the graduation mark representing the angle which the wheel should bear to the axle. Sighting then from the straight edge 52 to a straight edge held on the side of the wheel, or on a line on a floor as representative of the straight edge on the wheel or any other means available to sight to, it is easily seen what relation the wheel or equivalent bears to the straight edge 52 and the wheel or equivalent can be corrected to bear a desired angular relation to the axis of the axle.

The straight edge 52 and the bracket D, turned one quarter way around on the pivot pin 21 from the position shown in full lines in the drawing, will show by sighting from the straight edge 52 to the axle with the wheel removed, whether the axle is parallel with the straight edge 52 or is angular with the true level as shown by the bubble of the spirit level. Manipulation of the screw 44 changes the relation of the line 36 with the graduation marks 37 so that angularity of the axle can be determined thereby or the device can be set to a certain angular relation to the graduation marks 37 which may be desired between the axle and the true level and the axle corrected to that angle.

The device as a whole may be turned one quarter way around on the axle to bring the straight edge vertical or half way around to again bring the straight edge 52 horizontal; when correctly horizontal, the spirit level will again show horizontality or non-horizontality and the straight edge 52 can be tilted or pivotally moved to any desired angularity by means of the screw 44 and the axle checked or corrected thereto. When the device is turned half way around on the axle and a straight edge is held vertically on a side of a wheel, the relations of the two straight edges will show the vertical relation of the wheel to the horizontal axle.

The device can be swiveled all around on the axis of the axle so that almost any possible condition or axial relations of elements, such as axles and wheels, can be checked by the present device. The illustrations herein given should enable any one to apply the present device to various kinds of checking as to angular relations between parts of a structure having analogy to axles or shafts and wheels thereon.

The device shown and described is simple of structure, easy of operation, easily applied and removed from a mechanism to be checked, is attached correctly by its own mechanism, has a wide range of usefulness and application, is thoroughly reliable under the various conditions met in practice and remains reliable in that there is nothing in the structure thereof to get out of order in the normal use of the device.

Having described my invention and without limiting myself to the precise structure and arrangement of the parts as shown and described, I claim:

1. A member including a base having means for attachment thereof to an element to be checked and being pivotable about the axis thereof, and a checking means on said base including a part mounted on the top of said base to pivot about an axis at right angles to the first mentioned axis and a part mounted on the top of the first mentioned part to individually pivot about the second mentioned axis.

2. A member including a base having means for attachment thereof to an element to be checked and being pivotable about the axis thereof and a checking means on said base including a part mounted on the top of said base to pivot on an axis at right angles to the first mentioned axis, a part mounted on the top of the first mentioned part to individually pivot on the second mentioned axis, and a scale means between said base and said parts to show the degree to which said parts have been pivoted relative to said axis of said element base.

3. A member including a base having means for attachment thereof to an element to be checked and being pivotable about the axis thereof and a checking means on said base including a plate mounted on the top of said base to individually pivot on an axis vertical to the axis of pivot of said base and a straight edge carried by said plate at right angles to the axis of pivot of said plate.

4. A member including a base having means for attachment thereof to an element to be checked and being pivotable about the axis thereof, and a checking means on said base including a plate mounted on the top of said base to pivot on an axis vertical to the axis of pivot of said base, a bracket mounted on the top of said plate to individually pivot on the same axis as said plate, a plate mounted on said bracket to pivot thereon on an axis at right angles to the axis of pivot of the first mentioned plate, and a straight edge carried by said second mentioned plate at right angles to both of said axes.

5. A member including a base having means for attachment thereof to an element to be checked and being pivotable about the axis thereof and a checking means on said base including a plate mounted on the top of said base to pivot on an axis vertical to the axis of pivot of said base, a bracket on said plate to individually pivot on the same axis as said plate, a plate mounted on said bracket to pivot thereon on an axis at right angles to the axis of pivot of the first mentioned plate, a straight edge carried by said second mentioned plate at right angles to both of said axes, a scale means between said base and the first mentioned plate, a scale means between said bracket on the second mentioned plate, and a spirit level mounted on said straight edge.

6. A member including a base having means for attachment thereof to an element to be checked and being pivotable about the axis thereof and a checking means on said base including a part mounted on the top of said base to pivot in one plane, a part mounted on said part to pivot in a plane at right angles to the first mentioned plane, a scale means between one of said parts and said base, and a latch means to releasably lock said one part to said base when said scale means reads zero.

7. A member including a base having means for attachment thereof to an element to be checked and being pivotable about the axis thereof and a checking means on said base including a part mounted on said base to pivot in one plane, a part mounted on said part to pivot in a plane at right angles to the first mentioned plane, and a scale means between both of said parts to show relations thereof.

8. A member including a base having means for attachment thereof to an element to be checked and being pivotable about the axis thereof and a checking means on said base including a part mounted on said base to pivot in one plane, a part mounted on said part to pivot in a plane at right angles to the first mentioned plane, a scale means between one of said parts and said base, a latch means to lock said one part to said base when said scale means reads zero, and a scale means between both of said parts.

9. A member including a base having means for attachment thereof to an element to be checked and being pivotable about the axis thereof and a checking means on said base including a flat plate mounted on the top of said base to pivot on an axis vertical to the axis of pivot of said base, a straight edge carried by said plate at right angles to the axis of pivot of said plate, a scale means between said base and said plate, and a spirit level on a side of said straight edge.

10. A member including a base having means for attachment thereof to an element to be checked and being pivotable about the axis thereof, and a checking means on said base including a flat plate mounted on said base to pivot on an axis vertical to the axis of pivot of said base, a bracket of sheet metal on said plate to pivot individually on the same axis as said plate, a flat plate mounted on said bracket to pivot thereon on an axis at right angles to the axis of pivot of the first mentioned plate, a straight edge carried by said second mentioned plate at right angles to both of said axes, and a screw and lug means between said bracket and the second mentioned plate to pivotally move the second mentioned plate on the axis of pivot thereof.

11. A member including a base having means for attachment thereof to an element to be checked and being pivotable about the axis thereof and a checking means on said base including a flat plate mounted on said base to pivot on an axis vertical to the axis of pivot of said base, a bracket mounted on said plate to individually pivot on the same axis as said plate, a second plate mounted on said bracket to pivot on an axis perpendicular to the axis of pivot of the bracket and parallel with the axis of pivot of said base, a straight edge carried by said second plate at right angles to the axis of pivot thereof, a screw between said bracket and said second plate, a scale means between said base and said flat plate, a spirit level on a side of said straight edge, and a spring between said bracket and said second plate and said screw to pivotally move said second plate and said straight edge thereon relative to said base and said plates co-operative with the action of said screw.

12. A checking device including a base to be attached to an axle and being rotatable thereon, a bracket individually pivotable on the top of said base, a straight edge carried by said bracket and being pivotable on axes perpendicular to and parallel with the axis of rotation of said base.

13. A checking device including a base to be attached to an axle and being pivotable thereon, a bracket pivotally movable on the top of said base, a plate pivoted on said bracket, and a straight edge on said plate to move with said bracket and with said plate.

14. A base having means for attachment thereof to an element to be checked, a checking means of pivoted together elements mounted on the top of said base, an arcuate row of division marks on said base concentric with the axis of pivot thereof and spaced a considerable distance therefrom for precise reading of angularity, a flat plate pivotally movable on the top of said base, a bracket pivotally movable on the top of said plate, a second flat plate pivotally movable on said bracket and having an arcuate row of division marks thereon, an arm extending from said bracket and reaching to said row of division marks on said second plate and having an angle determining mark on the outer edge thereof and a locking means between the first mentioned plate and said base to releasably lock said first mentioned plate against pivoting when said angle determining mark registers with a zero mark on said row of division marks on said bracket.

EUGENE L. CARILLON.